US012690566B2

(12) United States Patent
Xiao et al.

(10) Patent No.: US 12,690,566 B2
(45) Date of Patent: Jul. 28, 2026

(54) INTELLIGENT SENSING BALL LAUNCHER

(71) Applicant: HANLAN TECHNOLOGY (HUIZHOU) CO., LTD, Huizhou City (CN)

(72) Inventors: Zhifeng Xiao, Huizhou City (CN); Jun Xiao, Huizhou City (CN)

(73) Assignee: HANLAN TECHNOLOGY (HUIZHOU) CO., LTD, Huizhou City (CN)

( * ) Notice: Subject to any disclaimer, the term of this patent is extended or adjusted under 35 U.S.C. 154(b) by 183 days.

(21) Appl. No.: 18/797,452

(22) Filed: Aug. 7, 2024

(65) Prior Publication Data

US 2025/0380668 A1     Dec. 18, 2025

(30) Foreign Application Priority Data

Jun. 14, 2024    (CN) ......................... 202410774314.0

(51) Int. Cl.
*A01K 15/02*      (2006.01)
*G05B 19/4155*      (2006.01)

(52) U.S. Cl.
CPC ........ A01K 15/025 (2013.01); G05B 19/4155 (2013.01); *G05B 2219/40544* (2013.01)

(58) Field of Classification Search
USPC .......................................................... 124/78
See application file for complete search history.

(56) References Cited

U.S. PATENT DOCUMENTS

| | | | | |
|---|---|---|---|---|
| 3,611,996 A | * | 10/1971 | Wegner ................ | A01K 15/025 |
| | | | | 124/36 |
| 4,267,799 A | * | 5/1981 | Bacon .................. | A01K 15/025 |
| | | | | 119/61.2 |
| 4,995,374 A | * | 2/1991 | Black ................... | A01K 15/025 |
| | | | | 124/32 |
| 9,301,503 B1 | * | 4/2016 | Arrighi .................... | F41B 4/00 |
| 10,117,419 B2 | * | 11/2018 | Hamill ................ | A01K 15/027 |

(Continued)

OTHER PUBLICATIONS

CH 721787 A1; System and Procedures for the Species-appropriate Keeping of Pets (Patent Publication and English Translation) (Year: 2025).*

(Continued)

*Primary Examiner* — Reginald S Tillman, Jr.
(74) *Attorney, Agent, or Firm* — Li & Cai Intellectual Property Office

(57) ABSTRACT

An intelligent sensing ball launcher is provided, including a housing, a ball-launching wheel, a driver, a processor, and a first sensor. The housing is provided with a ball entry port, a ball-launching port, and a slideway. The ball-launching wheel is disposed inside the housing, extends partially into the slideway, and configured to launch a ball passing through the slideway from the ball-launching port. The processor is electrically connected to the driver and configured to control a switching of the driver to drive the ball-launching wheel to rotate. The first sensor is disposed on the housing, electrically connected to the processor, and configured to sense whether or not a person or an animal is approaching. When sensing the person or the animal is approaching, the first sensor feeds back information to the processor, and then the processor controls the driver to operate to drive the ball-launching wheel to rotate.

18 Claims, 13 Drawing Sheets

(56) References Cited

U.S. PATENT DOCUMENTS

| | | | | |
|---|---|---|---|---|
| 10,625,135 B2 * | 4/2020 | Ward | ................... | A01K 15/025 |
| 10,898,781 B2 * | 1/2021 | Qian | ................... | A01K 15/025 |
| 11,794,087 B1 * | 10/2023 | Geng | ................... | A01K 15/025 |
| 2023/0080291 A1 * | 3/2023 | Ding | ................... | A63B 69/406 |
| | | | | 124/78 |

OTHER PUBLICATIONS

KR 20210100481 A; Training Device for Pet Dog (Patent Publication and English Translation) (Year: 2021).*
KR 20180089241 A; Pet Care Apparatus (Patent Publication and English Translation) (Year: 2018).*
KR 101710282 B1; Robot for Pet and Method for Controlling Thereof (Patent Publication and English Translation) (Year: 2017).*

* cited by examiner

A-A

A

A

INTELLIGENT SENSING BALL LAUNCHER

FIELD OF THE DISCLOSURE

The present disclosure relates to the technical field of pet toys, specifically to an intelligent sensing ball launcher.

BACKGROUND OF THE DISCLOSURE

With the improvement of living standards, pets have become an important part of many families. To increase pets' activity levels and entertainment, a variety of pet toys have appeared on the market, among which pet ball launchers are common and popular.

However, when the existing pet ball launchers are in use, the driver will continuously drive the ball-launching wheel to rotate, resulting in energy waste and making noise, so that the battery life of the product is affected and the comfort of people and pets is reduced. Therefore, there is in urgent need of improvement to pet ball launchers.

SUMMARY OF THE DISCLOSURE

The objective of the present disclosure is to address the shortcomings of current technology by providing an intelligent sensing ball launcher that enhances battery life and reduces noise production.

In order to achieve aforementioned purpose, the present disclosure provides an intelligent sensing ball launcher, including: a housing, wherein a ball entry port is provided on an upper end of the housing, a ball-launching port is provided on a front end of the housing, and a slideway is provided between the ball entry port and the ball-launching port; a ball-launching wheel disposed inside the housing and extending partially into the slideway, and configured to launch a ball passing through the slideway from the ball-launching port; a driver disposed inside the housing and configured to drive the ball-launching wheel to rotate; a processor disposed inside the housing electrically connected to the driver, and configured to control a switching of the driver; and a first sensor disposed on the housing electrically connected to the processor, and configured to sense whether or not a person or an animal is approaching; wherein when the first sensor senses that the person or the animal is approaching, the first sensor feeds back information to the processor, and then the processor control the driver to operate so as to drive the ball-launching wheel to rotate.

By employing the aforementioned technical solution, the present disclosure achieves significant benefits as follows. The first sensor is provided on the housing, so that the first sensor can sense whether or not the person or the animal is approaching. When the first sensor senses that the person or the animal is approaching, the driver activates to drive the ball-launching wheel to rotate to launch a ball passing through the slideway from the ball-launching port. Conversely, when the first sensor does not sense that the person or the animal is approaching, the driver remains inactive, so as to significantly reduce an operational duration of the driver, enhance a battery life of the product and effectively diminish duration of noise.

BRIEF DESCRIPTION OF THE DRAWINGS

To clarify the embodiments of the present disclosure or the technical solutions in the prior art, a brief introduction to the accompanying drawings used in the description of the embodiments or prior art is provided below. It is evident that the accompanying drawings described below are merely some embodiments of the present invention. For those skilled in the art, additional drawings can be obtained based on these drawings without any creative effort.

Figure 1:
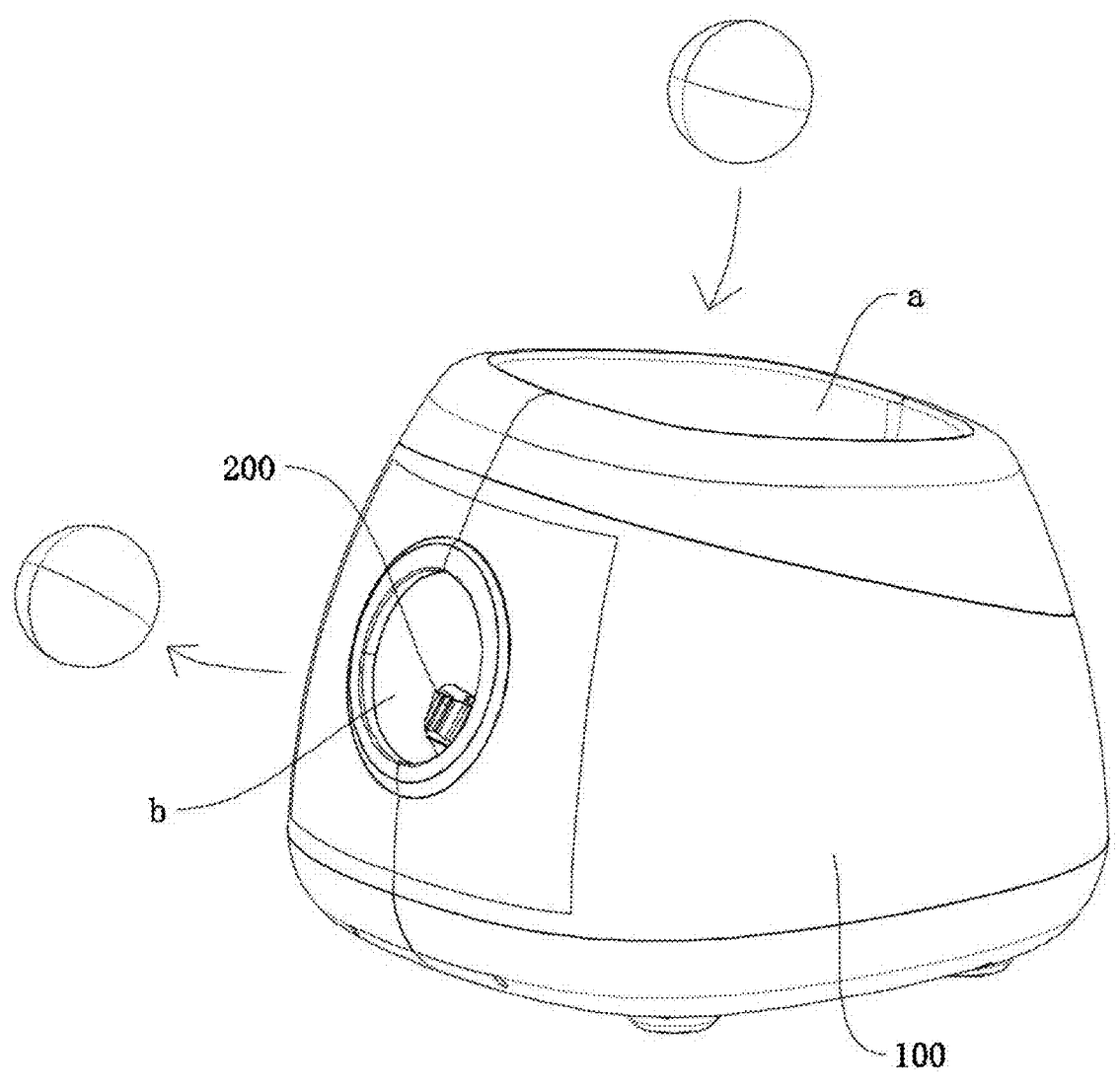
FIG. 1 is a schematic structural diagram of a ball launcher.

Reference numeral: a, ball entry port; b, ball-launching port; c, slideway; 100, housing; 200, ball-launching wheel; 300, motor; 400, first sensor; 500, movable baffle mechanism; 510, electric telescopic rod; 520, movable baffle; 521, third limit protrusion; 610, left channel plate; 620, right channel plate; 630, side plate; 631, first limit protrusion; 632, second limit protrusion; 640, shielding plate; 650, ball-launching port cover plate; 700, base; 710, protruding post; 800, motor cover; 810, continuous buckle; 811, circular buckle; 812, narrow connection; 900, feet pad; 1000, control switch.

DETAILED DESCRIPTION OF THE EXEMPLARY EMBODIMENTS

The present disclosure is further described in detail below in conjunction with the accompanying drawings.

This specific embodiment is merely an explanation of the present disclosure and is not a limitation of the present disclosure. Those skilled in the art can make modifications to this embodiment without creative contributions after reading this specification, but any modifications within the scope of the claims of the present disclosure are protected by patent law.

The present embodiment relates to an intelligent sensing ball launcher. Referring to FIG. 1 to FIG. 4, the intelligent sensing ball launcher includes a housing 100, a ball-launching wheel 200, a driver, a processor, and a first sensor 400.

A ball entry port a is provided on an upper end of the housing 100, a ball-launching port b is provided on a front end of the housing 100, and a slideway c is provided between the ball entry port a and the ball-launching port b. The ball-launching wheel 200 is disposed inside the housing 100 and extends partially into the slideway c, and configured to launch a ball passing through the slideway c from the ball-launching port b. The driver is disposed inside the housing 100 and configured to drive the ball-launching wheel to rotate. The processor is disposed inside the housing 100, electrically connected to the driver, and configured to control a switching of the driver. The first sensor 400 is disposed on the housing 100, electrically connected to the processor, and configured to sense whether or not a person or an animal is approaching. When the first sensor 400 senses that the person or the animal is approaching, the first sensor 400 feeds back information to the processor, and then the processor controls the driver to operate so as to drive the ball-launching wheel 200 to rotate.

The first sensor 400 is disposed on the housing 100, so that the first sensor 400 can sense whether or not the person or the animal is approaching. When the first sensor 400 senses that the person or the animal is approaching, the driver starts operating, thereby driving the ball-launching wheel 200 to rotate to launch the ball passing through the slideway c from the ball-launching port b. When the first sensor 400 does not sense that the person or the animal is approaching, the driver remains inactive, so as to greatly reduce a working time of the driver, and improve a battery life of the product and effectively reduce duration of noise. The first sensor 400 can be set to feed back the information to the processor when it senses that the person or the animal is within a predetermined range, or the first sensor 400 can be further set to feed back the information to the processor only when it senses that the person or the animal is within the predetermined range and moving. In this case, if the person or the animal is within a sensing range but not moving, the ball-launching wheel will not rotate so as to save more power. In the present embodiment, an effective sensing range of the first sensor 400 is set to 100 cm. In other embodiments, it can also be set to 80 cm, 60 cm, 50 cm, etc.

Figure 2:
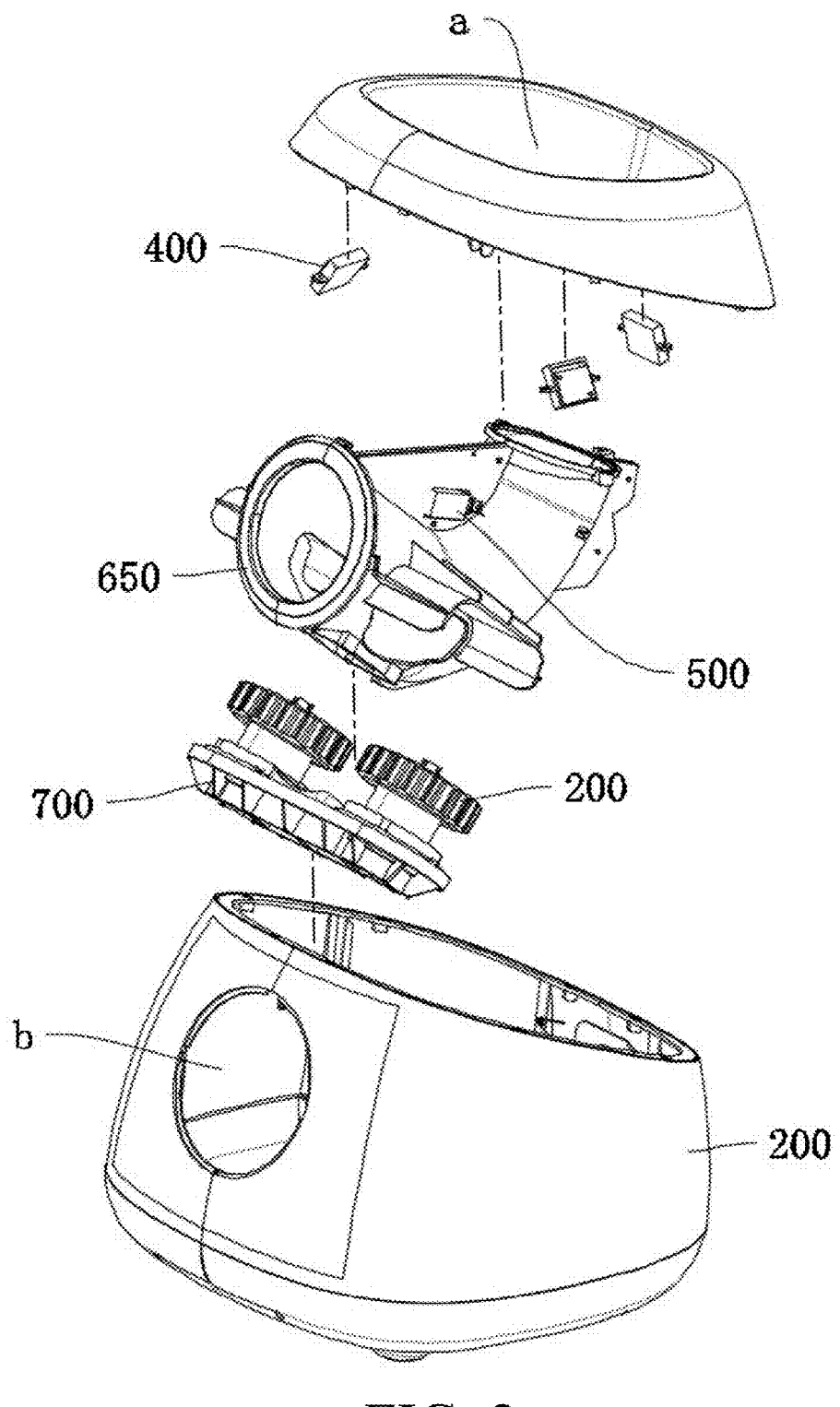
FIG. 2 is a schematic exploded view of the ball launcher.
Figure 3:
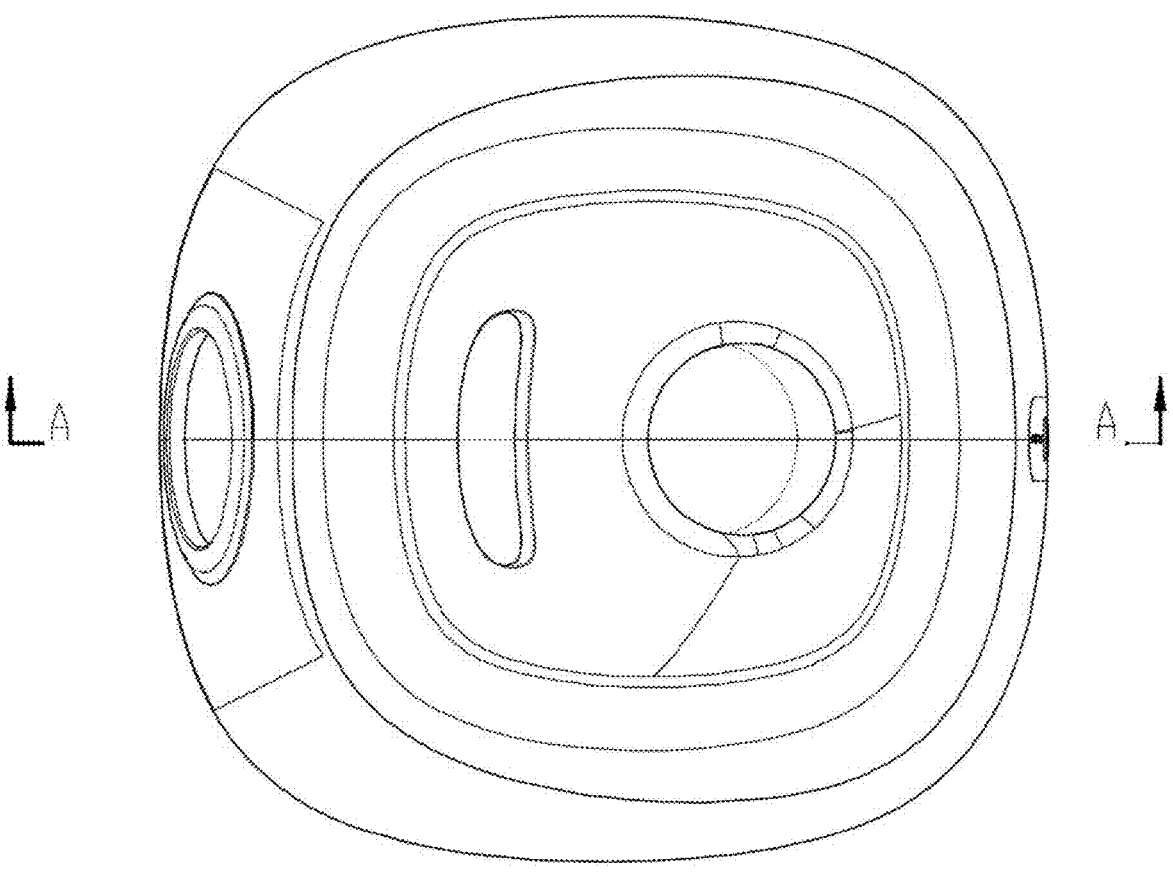
FIG. 3 is a schematic top view of the ball launcher.
Figure 4:
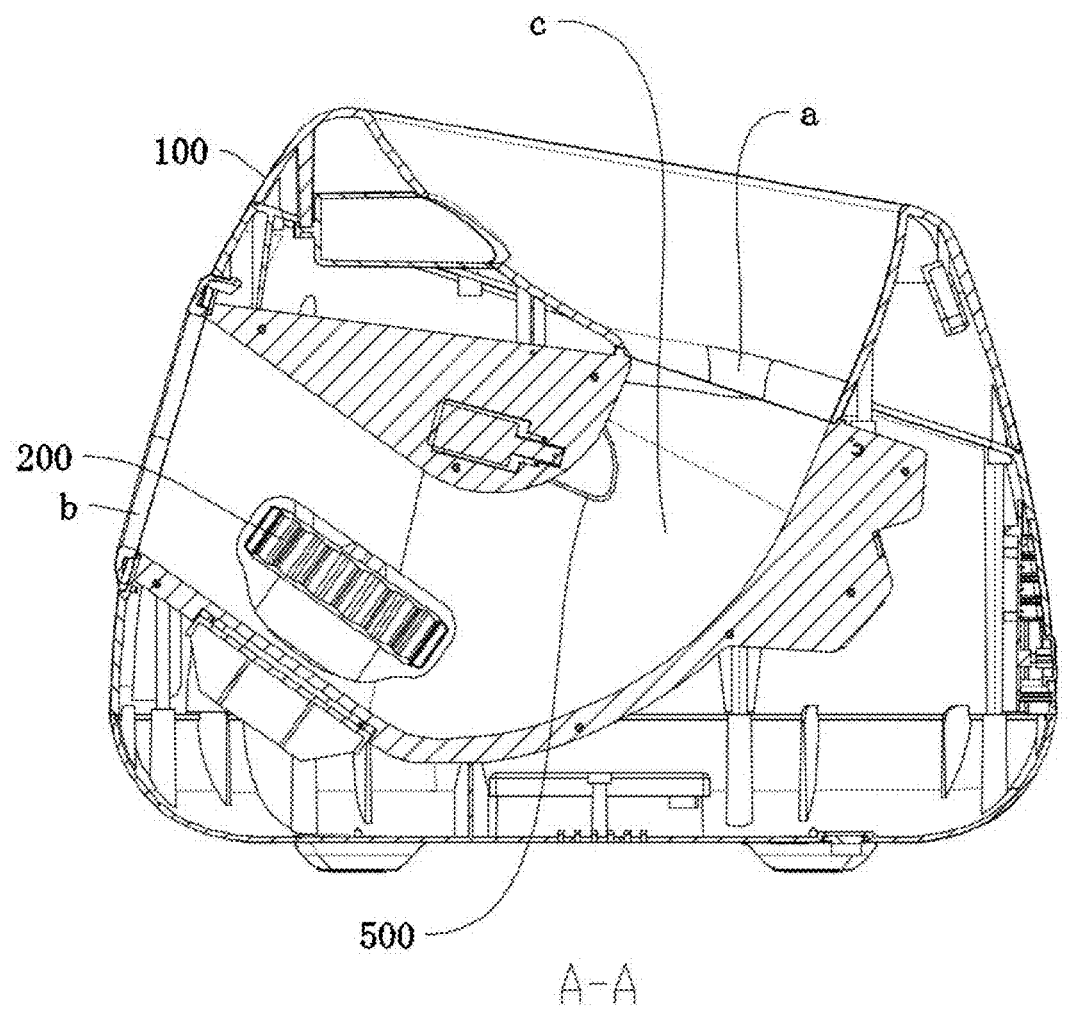
FIG. 4 is a cross-sectional view taken along line A-A in FIG. 3.

Referring to FIG. 2, in the present embodiment, there are three first sensors 400 distributed around a circumference of the housing 100. The sensing area formed by the three first sensors 400 is 360°. In the present embodiment, the first sensor 400 is a microwave sensor, and specifically a high-frequency microwave sensor. The sensing angle of a single high-frequency microwave sensor arranged on the housing 100 is about 180°. Sensing ranges of the three high-frequency microwave sensors overlap with each other to ensure no sensing blind spots. Certainly, the first sensor 400 can also be other sensors such as infrared sensors, or even an image acquisition module can be set. When an image acquisition module senses that the animal is approaching with a ball, the ball-launching wheel 200 will rotate.

Because the sensing area formed by the three first sensors 400 is 360°, this means that the three first sensors 400 in the present embodiment fully cover the circumference of the housing 100. Regardless of the direction from which the person or the animal (such as a dog) approaches wanting to launch the ball, the first sensors 400 can capture the person or the animal and then control the ball-launching wheel 200 to rotate.

In some embodiments, the first sensors 400 can also be provided with other quantities, such as one, two, four, or even more.

In some embodiments, one or more sensors can also form a sensing area of 210° to 350°, and the sensing area avoids the area where the ball-launching port b faces. Specifically, the sensing area can be 210°, 220°, 230°, 240°, 250°, 260°, 270°, 280°, 290°, 300°, 310°, 320°, 330°, 340°, 350°, and so on. When the person or the animal approaches from the direction of the ball-launching port b, the ball-launching wheel 200 will not rotate to prevent the launched ball from hitting the person or the animal intending to launch the ball or passing by, thereby improving the product safety.

Based on the 360° sensing area formed by the three first sensors 400, a second sensor (not shown in the figures) is disposed on the housing 100, and is electrically connected to the processor and configured to sense whether or not the person or the animal is approaching. A sensing area of the second sensor is an area where the ball-launching port b faces. When the first sensors 400 and the second sensor both sense that the person or the animal is approaching, the driver is not activated, and the ball-launching wheel 200 does not rotate. When the first sensors 400 sense that the person or the animal is approaching and the second sensor does not sense that the person or the animal is approaching, the information is feed back to the processor, and the processor controls the driver start to operate, thereby driving the ball-launching wheel 200 to rotate.

The configuration of the second sensor can also effectively prevent the launched ball from hitting the person or the animal intending to launch the ball or passing by, thereby improving the product safety. A sensing distance of the second sensor can be set differently from a sensing distance of the first sensors 400. The sensing distance of the second sensor can be farther than the sensing distance of the first sensors 400, such as within 50 cm for the first sensors 400 and within 300 cm for the second sensor.

Figure 5:
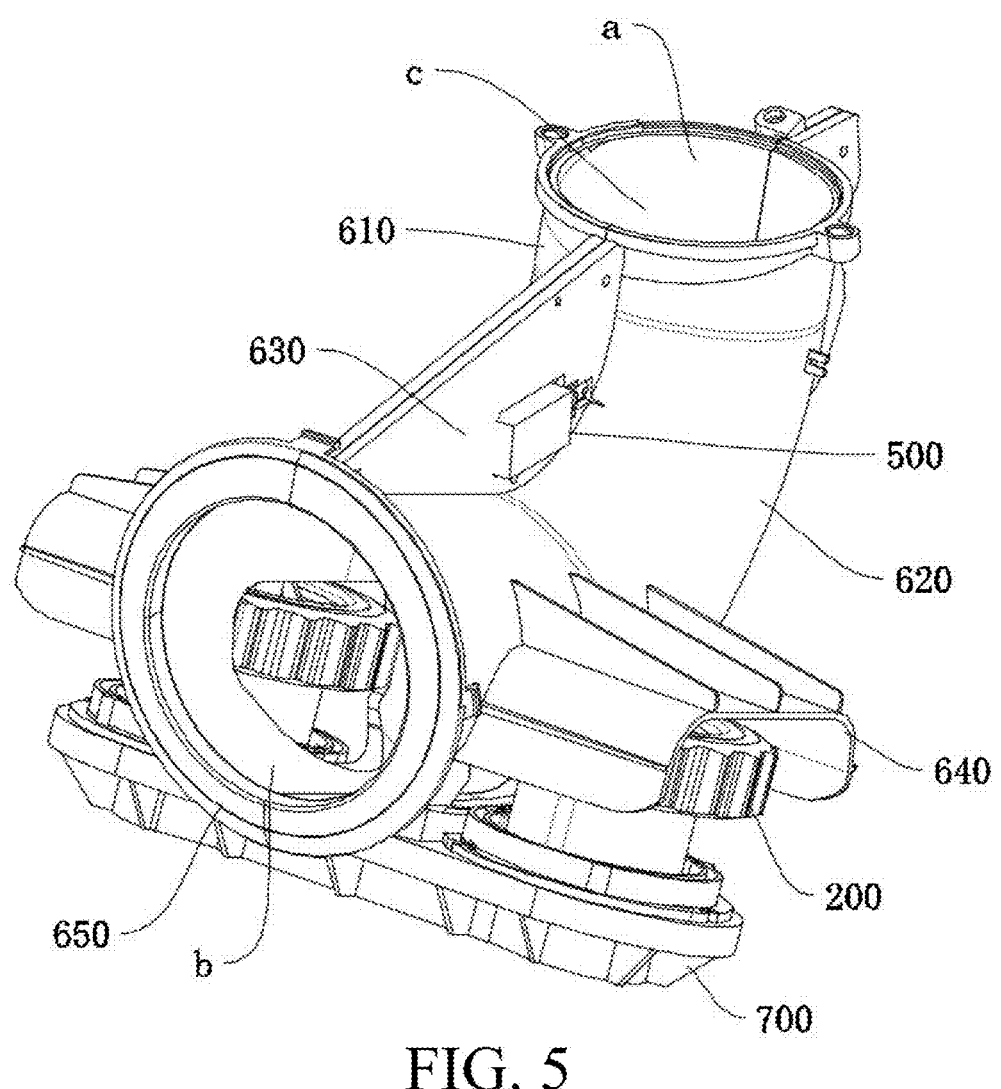
FIG. 5 is a schematic structural diagram of a part of the ball launcher.

Referring to FIG. 5, in the present embodiment, two ball-launching wheels 200 are provided, and are respectively installed on two sides of the slideway c. The two ball-launching wheels 200 work together to launch the ball from the ball-launching port b. Certainly, in some other embodiments, other quantities of ball-launching wheels 200 can also be set.

Further, referring to FIG. 2 and FIG. 4 to FIG. 9, a movable baffle mechanism 500 is movably disposed inside the slideway c and is close to the ball entry port a in the housing 100. The movable baffle mechanism 500 has two states. When the movable baffle mechanism 500 is in a first state, the movable baffle mechanism 500 is placed in the slideway c to prevent the ball from continuing to pass through the slideway c. When the movable baffle mechanism 500 is in a second state, the movable baffle mechanism 500 retracts to allow the ball to continue to pass through the slideway c.

The movable baffle mechanism 500 is normally closed, which is the first state. When the movable baffle mechanism 500 is in an open state, which is the second state, it will reset to the first state in a short time to prevent the ball-launching wheel 200 from getting stuck due to balls being continuously launched into the slideway c.

The movable baffle mechanism 500 will only be in the open state, which is the second state, under specific conditions, to allow the ball to continue to pass through the slideway c. These specific conditions can be delay settings. By setting a delay switch, the movable baffle mechanism 500 is opened to the second state 5-10 seconds after the ball-launching wheel 200 rotates. Specifically, in the present embodiment, the movable baffle mechanism 500 is opened to the second state 7 seconds after the ball-launching wheel 200 rotates.

Specifically, referring to FIG. 6 to FIG. 9, in the present embodiment, the movable baffle mechanism 500 includes an electric telescopic rod 510 and a movable baffle 520. The electric telescopic rod 510 is installed inside the housing 100. The movable baffle 520 is in a fan shape and rotatably installed inside the housing 100 through a rotating shaft, and is fixedly connected to the telescopic end of the electric telescopic rod 510. When the electric telescopic rod 510 extends and retracts, the telescopic end of the electric telescopic rod 510 pulls the movable baffle 520 to drive the movable baffle 520 to rotate around the rotating shaft, thereby controlling the movable baffle 520 to rotate into the slideway c (in the first state), so as to prevent the ball from continuing to pass through the slideway c, or to control the movable baffle 520 to rotate out of the slideway c (in the second state) to allow the ball to continue to pass through the slideway c.

More specifically, referring to FIG. 5 to FIG. 9, the housing 100 is provided with a left channel plate 610 and a right channel plate 620, and the left channel plate 610 and the right channel plate 620 together define the slideway c. A side plate 630 is provided on each of an upper side of the left channel plate 610 and an upper side of the right channel plate 620, and the electric telescopic rod 510 is installed between the two side plates 630. When the movable baffle 520 is in the second state, the electric telescopic rod 510 is retracted between the two side plates 630. An opening is provided between the side plates 630 and the left channel plate 610 and the right channel plate 620 for the movable baffle 520 to rotate from the side plates 630 into the slideway c to allow the movable baffle 520 to rotate smoothly into the slideway c. To limit a rotation angle of the movable baffle 520, a first limit protrusion 631 is provided on an inner side of the side plate 630. The purpose of the first limit protrusion 631 is to prevent the movable baffle 520 from rotating further away from the channel when in the second state. A second limit protrusion 632 is provided on the inner side of the side plates 630 above the opening. An upper inclined edge of the movable baffle 520 is provided with a third limit protrusion 521 extending forward. When the movable baffle 520 is in the first state, the third limit protrusion 521 is limited by the second limit protrusion 632 to prevent the second limit protrusion 632 from continuing to rotate into the channel, thereby limiting the movable baffle 520 from continuing to rotate into the channel. In addition, when the movable baffle 520 is in the first state, if a ball enters at this time, since the third limit protrusion 521 is limited by the second limit protrusion 632, the movable baffle 520 will not be hit by the ball, and the ball can be well blocked at the ball entry port a.

Figure 6:
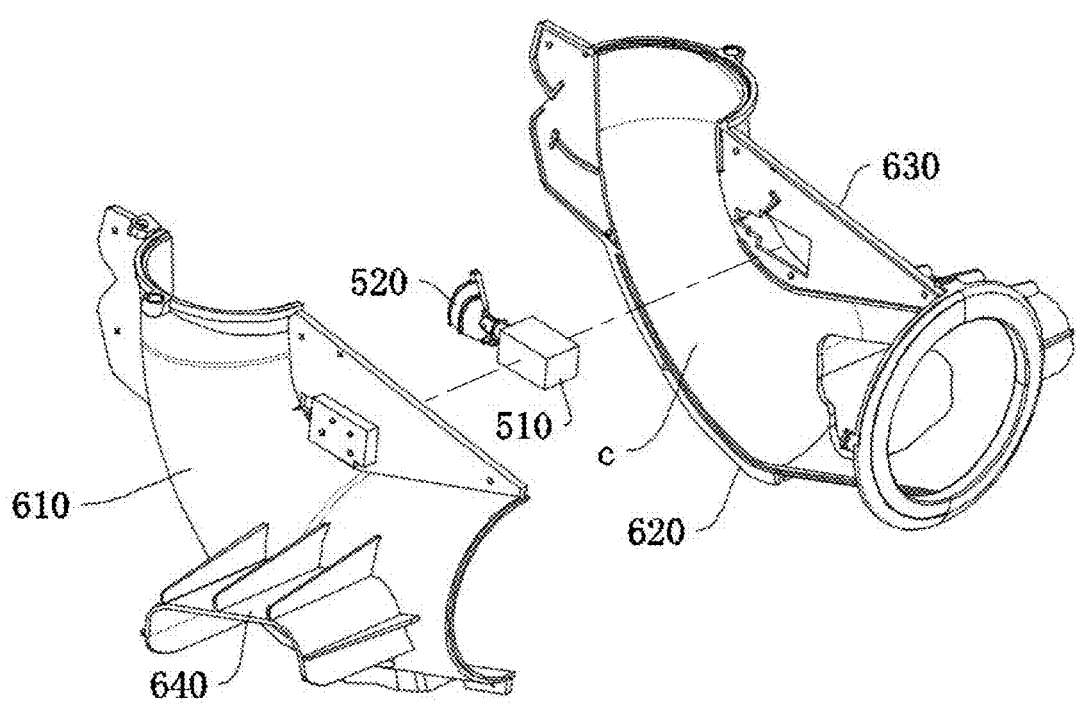
FIG. 6 is a schematic structural diagram of a channel plate and a movable baffle mechanism.
Figure 7:
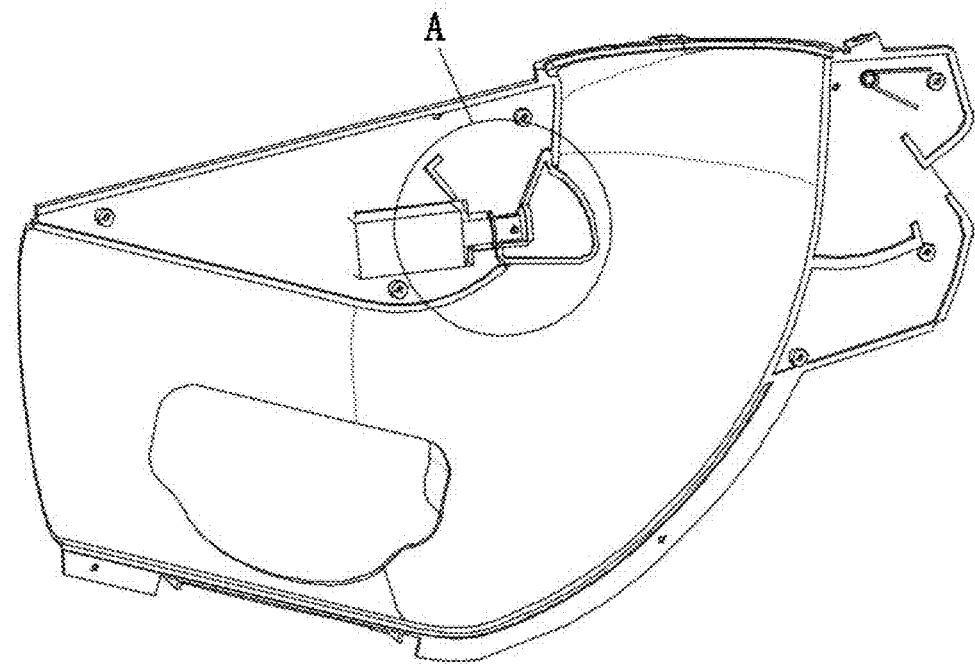
FIG. 7 is a schematic structural diagram of the movable baffle mechanism in a first state.
Figure 8:
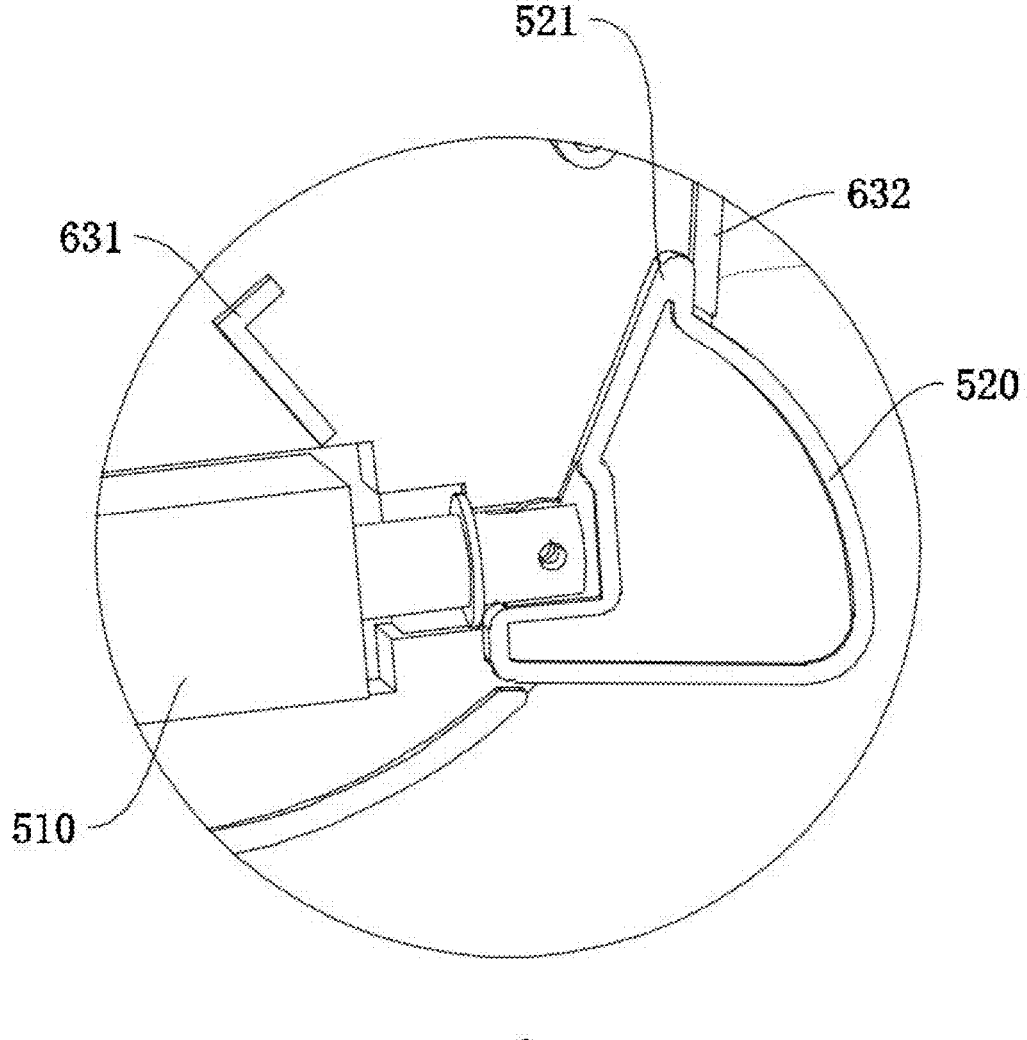
FIG. 8 is an enlarged view of part A in FIG. 7.
Figure 9:
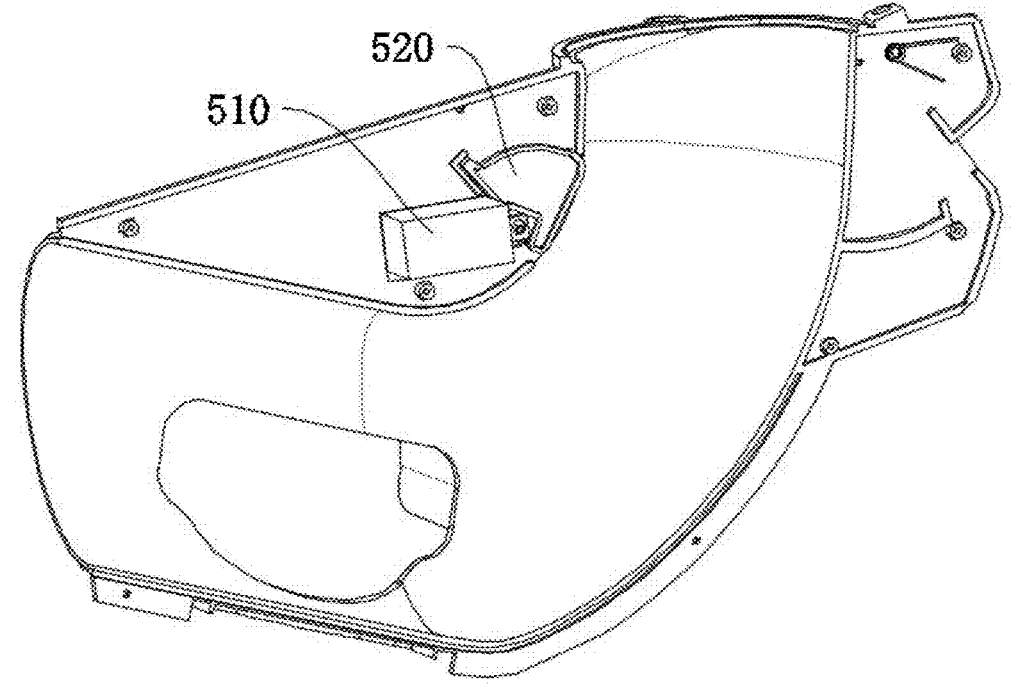
FIG. 9 is a schematic structural diagram of the movable baffle mechanism in a second state.

More specifically, referring to FIG. 5 to FIG. 6, each of the left channel plate 610 and the right channel plate 620 has an avoidance hole through which an outer edge of the ball-launching wheel 200 pass. A shielding plate 640 is provided on each of an outer side of the left channel plate 610 and an outer side of the right channel plate 620 above the avoidance holes. The shielding plate 640 is arranged in an arc shape, partially enclosing the ball-launching wheel 200 to provide protection to the ball-launching wheel 200. The left channel plate 610 and the right channel plate 620 are in communication with the side plates 630 and shielding plates 640 provided thereon to together form a shape similar to an airplane.

More specifically, referring to FIG. 1, FIG. 2, FIG. 5, and FIG. 6, the left channel plate 610 and the right channel plate 620 are correspondingly installed inside the housing 100 through the ball-launching port b cover plate.

In the present embodiment, the ball-launching wheel 200 is movably disposed inside the housing 100. By providing the ball-launching wheel 200 with a movable position inside the housing 100, a distance between a center of the ball-launching wheel 200 and the slideway c can be changed by moving the ball-launching wheel 200. Since a radius of the ball-launching wheel 200 is fixed, a position where the edge of the ball-launching wheel 200 is placed into the slideway c will be changed. Consequently, such the ball launcher can launch balls of various sizes.

6

Figure 10:
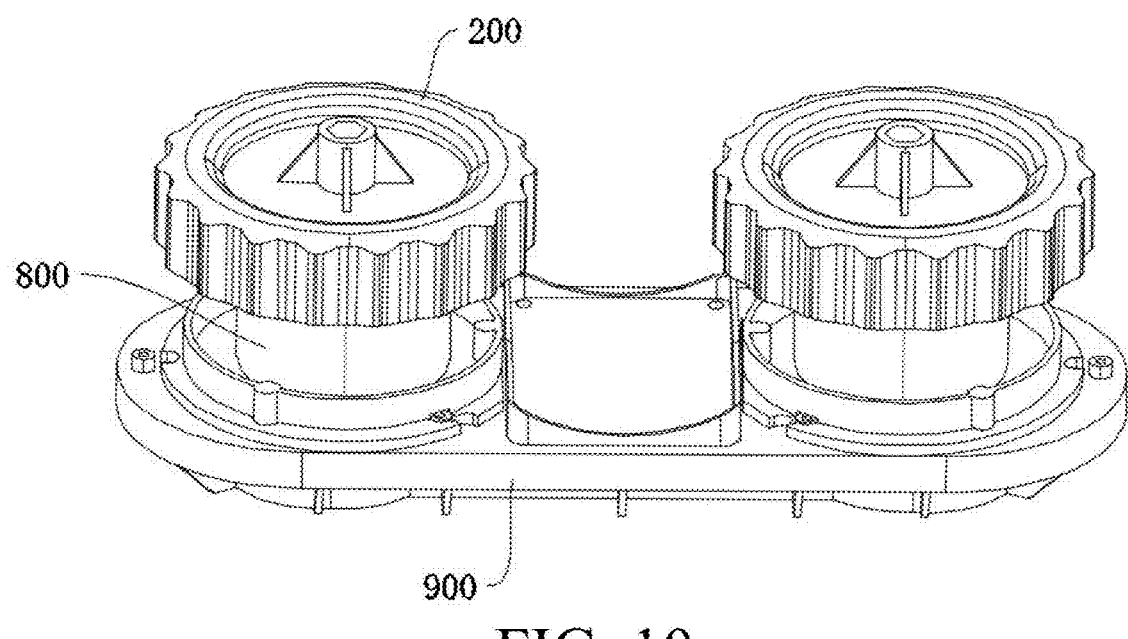
FIG. 10 is a schematic structural diagram of a ball-launching wheel in one position.
Figure 11:
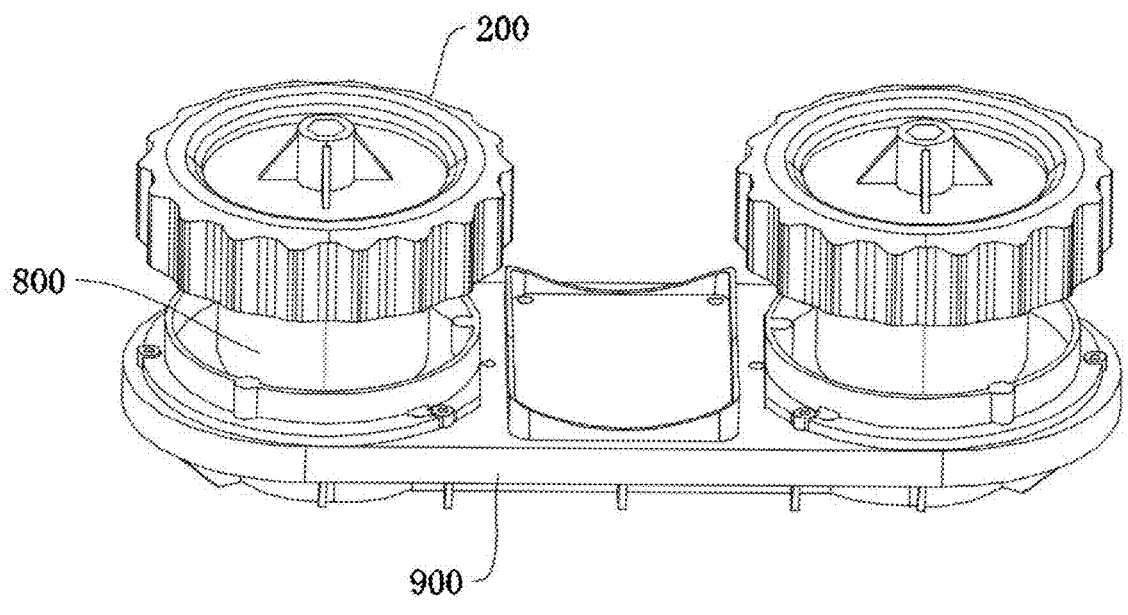
FIG. 11 is a schematic structural diagram of the ball-launching wheel in another position.
Figure 12:
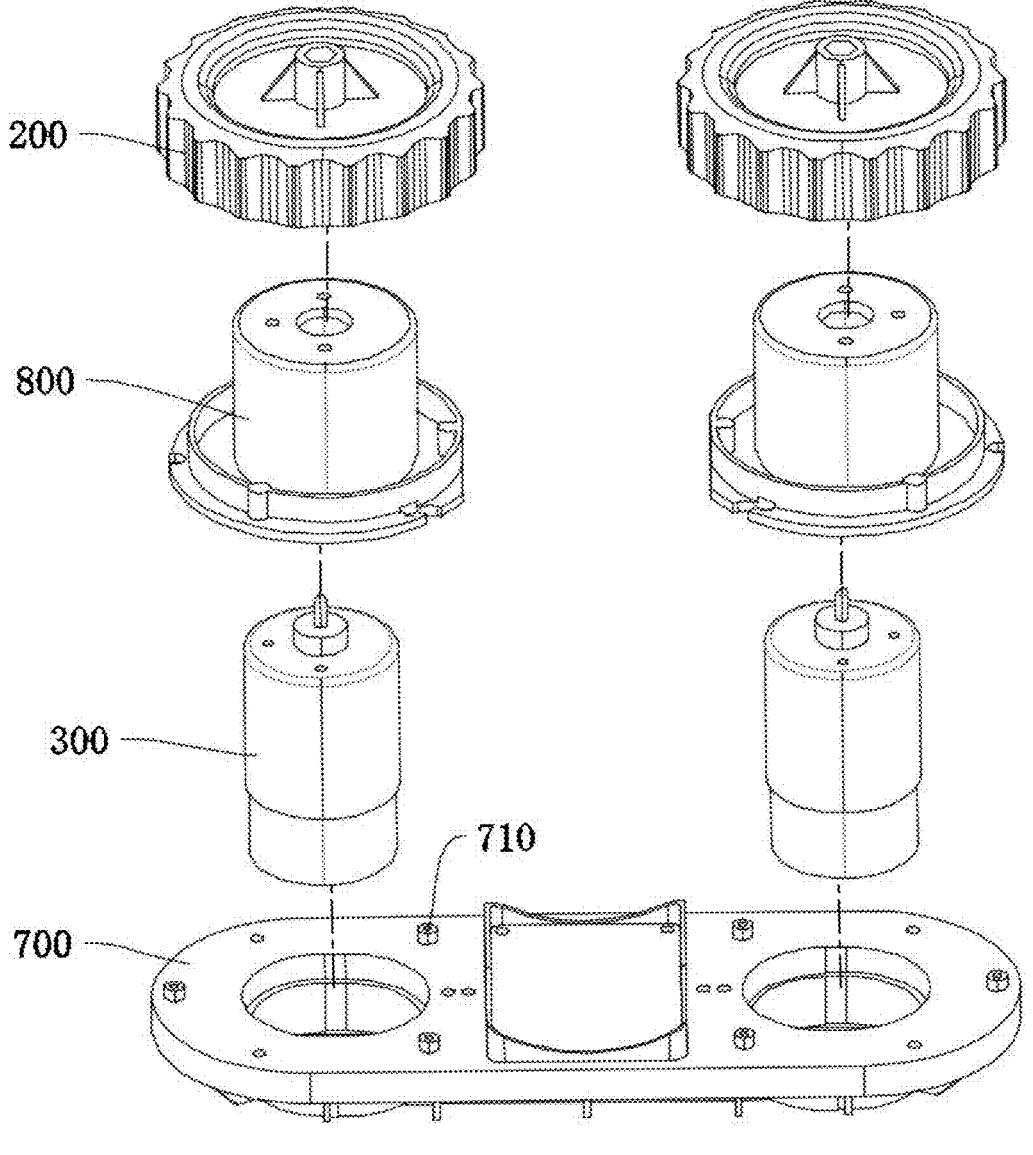
FIG. 12 is a schematic exploded view of the ball-launching wheel, a motor cover, a motor, and a base.

Specifically, referring to FIG. 10 to FIG. 12, the driver is a motor 300. A base 700 is provided inside the housing 100, the base 700 is provided with a plurality of installing positions for the motor 300, and each of the plurality of installing positions is at a different distance from the slideway c. When the motor 300 is installed in a different position, a distance between the motor 300 and the slideway c changes accordingly. Since the ball-launching wheel 200 is fixedly installed on an output shaft of the motor 300, the position of the edge of the ball-launching wheel 200 in the slideway c will be changed accordingly, so that the ball launcher can launch balls of various sizes.

Referring to FIG. 10 to FIG. 12, in the present embodiment, the motor 300 is installed on the base 700 through a motor cover 800. An outer edge of the motor cover 800 is provided with a continuous buckle 810, and the base 700 is provided with a protruding post 710 corresponding to the continuous buckle 810. When the protruding post 710 is engaged in a different position of the continuous buckle 810, a distance between the motor cover 800 and the slideway c varies. Since the motor 300 is installed on the base 700 through the motor cover 800, the motor 300 is also moved to different installing positions on the base 700. As the ball-launching wheel 200 is fixedly installed on the output shaft of the motor 300, the position of the edge of the ball-launching wheel 200 in the slideway c will be changed accordingly, so that the ball launcher can launch balls of various sizes.

Figure 13:
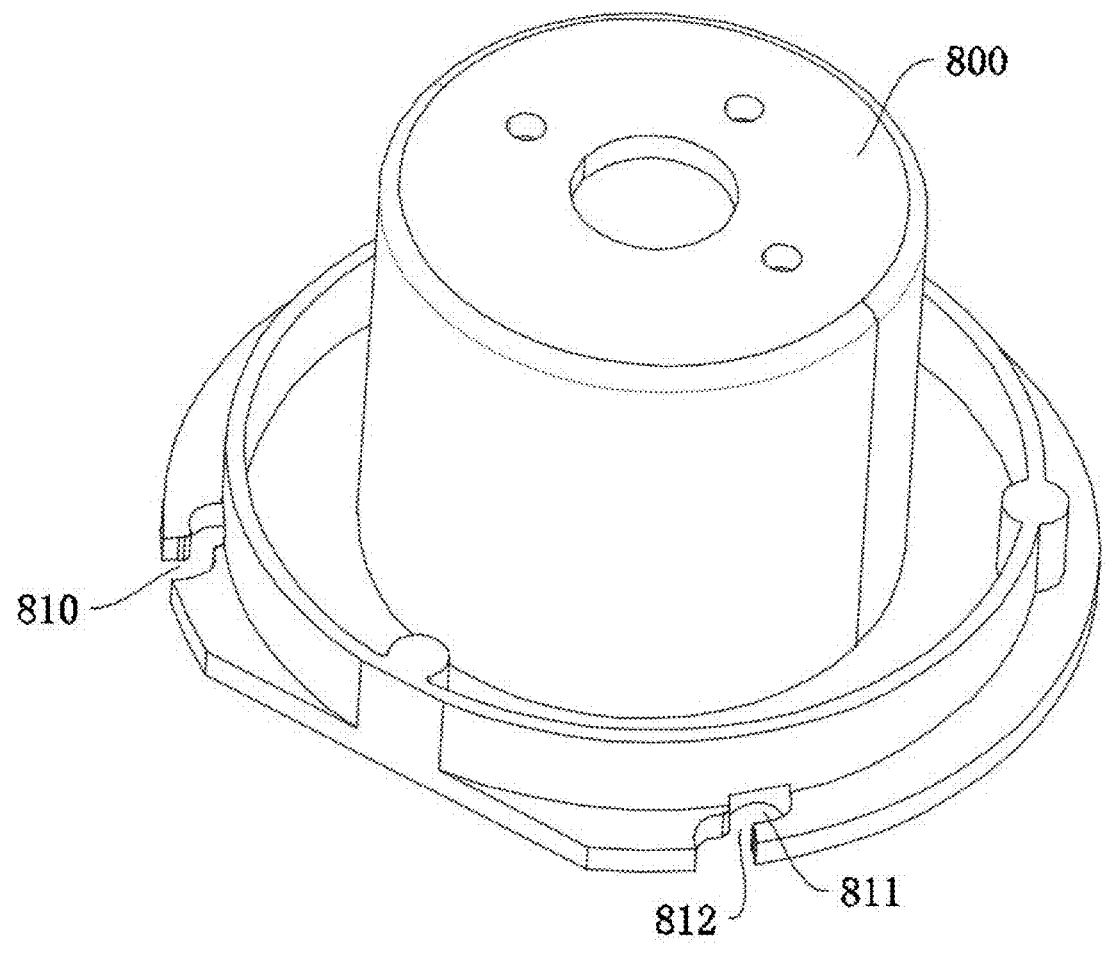
FIG. 13 is a schematic structural diagram of the motor cover.

More specifically, referring to FIG. 12 and FIG. 13, the continuous buckle 810 includes a plurality of circular buckles 811 that are sequentially arranged, and the plurality of circular buckles 811 are connected by a narrow connection 812. The protruding post 710 can be engaged to any of the plurality of circular buckles 811, and the protruding post 710 can enter adjacent circular buckles 811 by passing through the narrow connection 812. In the present embodiment, the continuous buckle 810 includes two circular buckles 811 that are sequentially arranged, meaning that the ball-launching wheel 200 can switch between two positions. In other embodiments, the continuous buckle 810 can include other numbers of circular buckles 811. In other embodiments, the continuous buckle 810 can also be set to other shapes.

In some embodiments, the motor is also installed on the base through the motor cover. The outer edge of the motor cover is provided with at least one buckle, and the base is provided with at least one protruding post. Multiple buckles and/or multiple protruding posts can be provided. When different buckles and protruding posts are matched, the distance between the motor cover and the slideway varies, so that the position of the ball-launching wheel can be changed to allow the ball launcher to launch balls of various sizes.

In some embodiments, the motor is also installed on the base through the motor cover. The motor cover is provided with a plurality of regions for installing the motor, and each of the plurality of regions has a different distance from the slideway c. By changing the position of the motor within the motor cover, the position of the ball-launching wheel can be changed to allow the ball launcher to launch balls of various sizes.

In some embodiments, the housing is provided with a motor cover for installing the driver. The motor cover is movably disposed inside the housing, and the motor cover is moved to change the distance between the motor cover and the slideway c, so that the position of the ball-launching wheel can be changed to allow the ball launcher to launch balls of various sizes.

Figure 14:
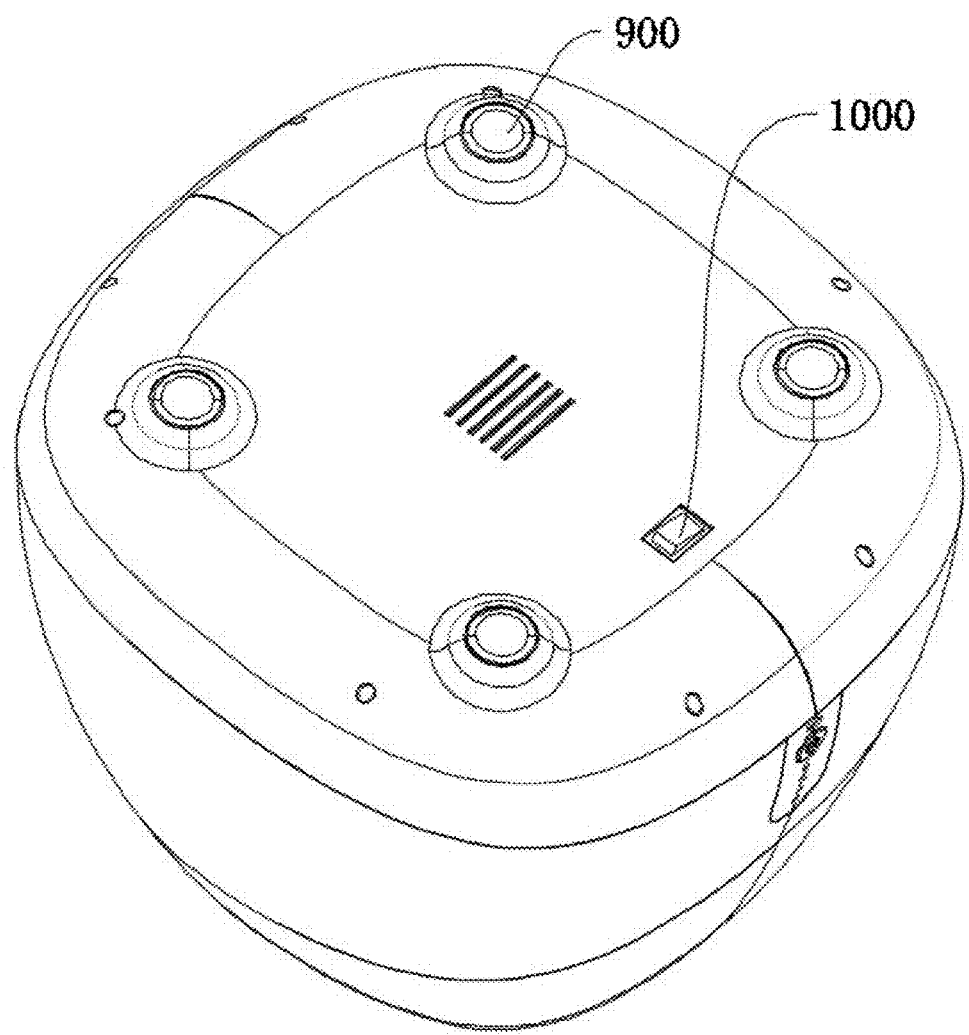
FIG. 14 is a schematic structural diagram of the ball launcher from another perspective.

Referring to FIG. 14, in the present embodiment, a bottom side of the housing 100 is provided with a feet pad 900. The feet pad 900 provides anti-slip functionality, and also elevates the housing 100 to prevent external moisture from entering from the bottom side of the housing 100.

Also referring to FIG. 14, the bottom side of the housing 100 is provided with a control switch 1000. The control switch 1000 is arranged on the bottom side of the housing 100 to prevent accidental touches of the control switch 1000 during use, thereby avoiding shutting down the ball launcher. This is especially important when pets are playing with the ball launcher, as some pets might pounce on the ball launcher. If the control switch 1000 is placed in other positions on the housing 100, pets might accidentally touch the control switch 1000 to affect the user experience.

The ball launcher is provided with a built-in battery and can be used without connecting to an external power source. Certainly, the battery can also be a rechargeable battery. If no battery is provided, it will need to be connected to an external power source for use, which is less convenient.

The ball launcher is provided with adjustment buttons that can adjust different gears and modes to change the distance the ball is launched.

The above description is only configured to explain the technical solutions of the present disclosure and not to limit them. Any modifications or equivalent replacements made by those skilled in the art to the technical solutions of the present disclosure should fall within the scope of the claims of the present disclosure, as long as they do not depart from the spirit and scope of the technical solutions of the present disclosure.

What is claimed is:

1. An intelligent sensing ball launcher, comprising:
a housing, wherein a ball entry port is provided on an upper end of the housing, a ball-launching port is provided on a front end of the housing, and a slideway is provided between the ball entry port and the ball-launching port;
at least one ball-launching wheel disposed inside the housing and extending partially into the slideway, and configured to launch a ball passing through the slideway from the ball-launching port;
a driver disposed inside the housing and configured to drive the ball-launching wheel to rotate;
a processor disposed inside the housing, electrically connected to the driver, and configured to control a switching of the driver; and
at least one first sensor disposed on the housing, electrically connected to the processor, and configured to sense whether or not a person or an animal is approaching;
wherein, when the first sensor senses that the person or the animal is approaching, the first sensor feeds back information to the processor, and then the processor controls the driver to operate so as to drive the ball-launching wheel to rotate.

2. The intelligent sensing ball launcher according to claim 1, wherein multiple first sensors are distributed around a circumference of the housing.

3. The intelligent sensing ball launcher of claim 2, wherein the multiple first sensors together form a sensing area of 360°.

4. The intelligent sensing ball launcher according to claim 3, wherein a second sensor is provided on the housing, electrically connected to the processor and configured to sense whether or not the person or the animal is approaching, and a sensing area of the second sensor is an area where the ball-launching port faces;
wherein, when both the first sensor and the second sensor sense that the person or the animal is approaching, the driver is not activated; and
wherein, when the first sensor senses that the person or the animal is approaching and the second sensor does not sense that the person or the animal is approaching, the first sensor feeds back that information to the processor, and the processor controls the driver to operate so as to drive the ball-launching wheel to rotate.

5. The intelligent sensing ball launcher according to claim 2, wherein a sensing area formed by the multiple first sensors ranges from 210° to 350°, and the sensing area avoids an area where the ball-launching port faces.

6. The intelligent sensing ball launcher according to claim 1, wherein the first sensor is an infrared sensor or a microwave sensor.

7. The intelligent sensing ball launcher according to claim 1, wherein a movable baffle mechanism is movably disposed inside the slideway and adjacent to the ball entry port in the housing, and the movable baffle mechanism has two states;
wherein, when the movable baffle mechanism is in a first state, the movable baffle mechanism is placed inside the slideway to stop the ball from passing through the slideway;
wherein, when the movable baffle mechanism is in a second state, the movable baffle mechanism retracts to allow the ball to continue to pass through the slideway.

8. The intelligent sensing ball launcher according to claim 7, wherein the movable baffle mechanism includes:
an electric telescoping rod installed inside the housing; and
a movable baffle, wherein the movable baffle is in a fan shape, rotatably installed inside the housing through a rotating shaft, and fixedly connected to a telescopic end of the electric telescoping rod;
wherein, when the electric telescoping rod extends or retracts, the telescopic end of the electric telescoping rod pulls the movable baffle to drive the movable baffle to rotate into the slideway to prevent the ball from continuing to pass through the slideway, or to control the movable baffle to rotate out of the slideway to allow the ball to continue to pass through the slideway.

9. The intelligent sensing ball launcher according to claim 1, wherein the ball-launching wheel is movably disposed inside the housing, and the ball-launching wheel is moved to change a distance between a center of the ball-launching wheel and the slideway to adapt to balls of different sizes.

10. The intelligent sensing ball launcher according to claim 9, wherein the driver is a motor, a base is provided inside the housing, a plurality of installing positions for the motor are provided on the base, and each of the plurality of installing positions is at a different distance from the slideway.

11. The intelligent sensing ball launcher according to claim 10, wherein the motor is installed on the base through a motor cover, at least one buckle is provided on an outer edge of the motor cover, at least one protruding post is provided on the base, and wherein multiple buckles and/or multiple protruding posts are provided, and wherein, when different buckles and protruding posts are matched, a distance between the motor cover and the slideway varies.

12. The intelligent sensing ball launcher according to claim 10, wherein the motor is installed on the base through a motor cover, a continuous buckle is provided on an outer edge of the motor cover, a protruding post corresponding to the continuous buckle is provided on the base, and wherein, when the protruding post is engaged in a different position of the continuous buckle, a distance between the motor cover and the slideway varies.

13. The intelligent sensing ball launcher according to claim 12, wherein the continuous buckle includes a plurality of circular buckles that are sequentially provided, the plurality of circular buckles are connected by a narrow connection, the protruding post is able to be engaged to any of the plurality of circular buckles, and the protruding post enters adjacent circular buckles by passing through the narrow connection.

14. The intelligent sensing ball launcher according to claim 10, wherein the motor is installed on the base through a motor cover, a plurality of regions for installing the motor are provided on the motor cover and each of the plurality of regions has a different distance from the slideway.

15. The intelligent sensing ball launcher according to claim 9, wherein the motor cover for installing the driver is provided on the housing, the motor cover is movably installed inside the housing, and the motor cover is moved to change a distance between the motor cover and the slideway.

16. The intelligent sensing ball launcher according to claim 1, wherein two ball-launching wheels are respectively disposed on two sides of the slideway, and the two ball-launching wheels cooperate to launch the ball from the ball-launching port.

17. The intelligent sensing ball launcher according to claim 1, wherein a feet pad is provided on a bottom side of the housing.

18. The intelligent sensing ball launcher according to claim 17, a control switch is provided on the bottom side of the housing.

* * * * *